United States Patent
Medvedev et al.

[19]

[11] Patent Number: 6,166,860

[45] Date of Patent: Dec. 26, 2000

[54] SCREEN ILLUMINATION APPARATUS AND METHOD

[75] Inventors: Vladimir Medvedev, El Segundo; William A Parnyn, Lomita, both of Calif.

[73] Assignee: Teledyne Lighting and Display Products, Inc., Hawthorne, Calif.

[21] Appl. No.: 09/375,400

[22] Filed: Aug. 17, 1999

[51] Int. Cl.[7] .......................... G02B 27/30; G02B 27/10; G02B 17/00; G02B 3/08; G02B 13/02

[52] U.S. Cl. ..................... 359/641; 359/618; 359/727; 359/742; 359/748

[58] Field of Search ................................ 339/641, 618, 339/727, 742, 748

[56] References Cited

U.S. PATENT DOCUMENTS 5,883,745  3/1999  Kelley ........................... 359/618
5,926,320  7/1999  Parkyn, Jr. et al. .

Primary Examiner—Georgia Epps
Assistant Examiner—Michael A. Lucas
Attorney, Agent, or Firm—William W. Haefliger

[57] ABSTRACT

In a device for directing light longitudinally forwardly, the combination comprising a light source, and a protective, transparent envelope extending about the light source; a drum lens having a body extending about the light source and envelope, for refracting light from the source; a light reflector extending about the drum lens body, for forwardly and convergently re-directing refracted light received from the drum lens body; and a correcting lens for receiving a collimating re-directed light screened from the reflector.

13 Claims, 2 Drawing Sheets

SCREEN ILLUMINATION APPARATUS AND METHOD

BACKGROUND OF THE INVENTION

This invention relates generally to efficient illumination of targets, as for example screens, such as liquid crystal displays.

There is need for devices of the type disclosed herein, and in particular for uniform illumination of screens, using compact high-brightness light sources.

SUMMARY OF THE INVENTION

It is a major object of the invention to provide an improved device of the type referred to and comprising, in combination:

a) a light source, and a protective envelope about that source, b) a drum lens having a body extending about the light source and envelope, for refracting light from the source, c) a light reflector extending about the drum lens body, for forwardly re-directing refracted light received from the drum lens body, d) and a correcting lens for receiving a collimating re-directed light screened from the reflector.

It is another object of the invention to provide such device with a longitudinally forwardly extending optical axis intersecting the source, the drum lens, reflector, and correcting lens being circularly symmetric about the optical axis.

It is a further object of the invention to provide an aspheric lens extending longitudinally forwardly of the envelope to receive light from the source via the envelope and to refract light toward the correcting lens, the light refracted by the aspheric lens producing a primary beam, and light reflected by the reflector producing a secondary beam, the two beams substantially merging at the correcting lens. As will be seen, the aspheric lens is preferably integral with the drum lens.

Yet another object is to provide such an aspheric lens having an inner surface longitudinally facing the envelope, said inner surface having forward convexity, and the aspheric lens having an outer surface longitudinally facing away from the envelope, said outer surface having forward convexity which exceeds the forward convexity of the inner surface.

An additional object is to provide a local that outer surface having forward convexity which exceeds the convexity of the inner surface.

An additional object is to provide a local juncture between the drum lens and the aspheric lens, and located to separate light refracted by the drum lens and the aspheric lens, whereby a gap is formed between light refracted by the aspheric lens and light reflected by the reflector. As will be seen, the drum lens may advantageously have an inner substantially cylindrical surface intercepting an edge defined by said aspheric lens inner surface. Also, the drum lens may have an outer outwardly convex surface terminating outwardly of an edge defined by the aspheric lens outer surface.

A yet further object is to provide a target spaced forwardly of the aspheric lens and reflector, the target positioned to receive collimated light via the aspheric lens and reflector. The target may advantageously comprise a liquid crystal display.

A related U.S. Pat. No. 5,926,320 issued Jul. 20, 1999.

These and other objects and advantages of the invention, as well as the details of an illustrative embodiment, will be more fully understood from the following specification and drawings, in which:

DRAWING DESCRIPTION

FIG. 1 is a view in section of a light source, drum lens, and reflector, incorporating the invention; and FIG. 2 is a view like FIG. 2 but also showing a corrective lens and a target;

DETAILED DESCRIPTION

This invention offers an improved method of efficiently and uniformly illuminating a screen, such as a liquid crystal display, using a compact high-brightness source, such as the spherical plasma lamp. One such lamp is marketed by Fusion Lamps. The device basically consists of a central drum lens surrounding the source, a reflector situated around the drum lens, and a correcting lens at the reflector's aperture.

Figure 1:
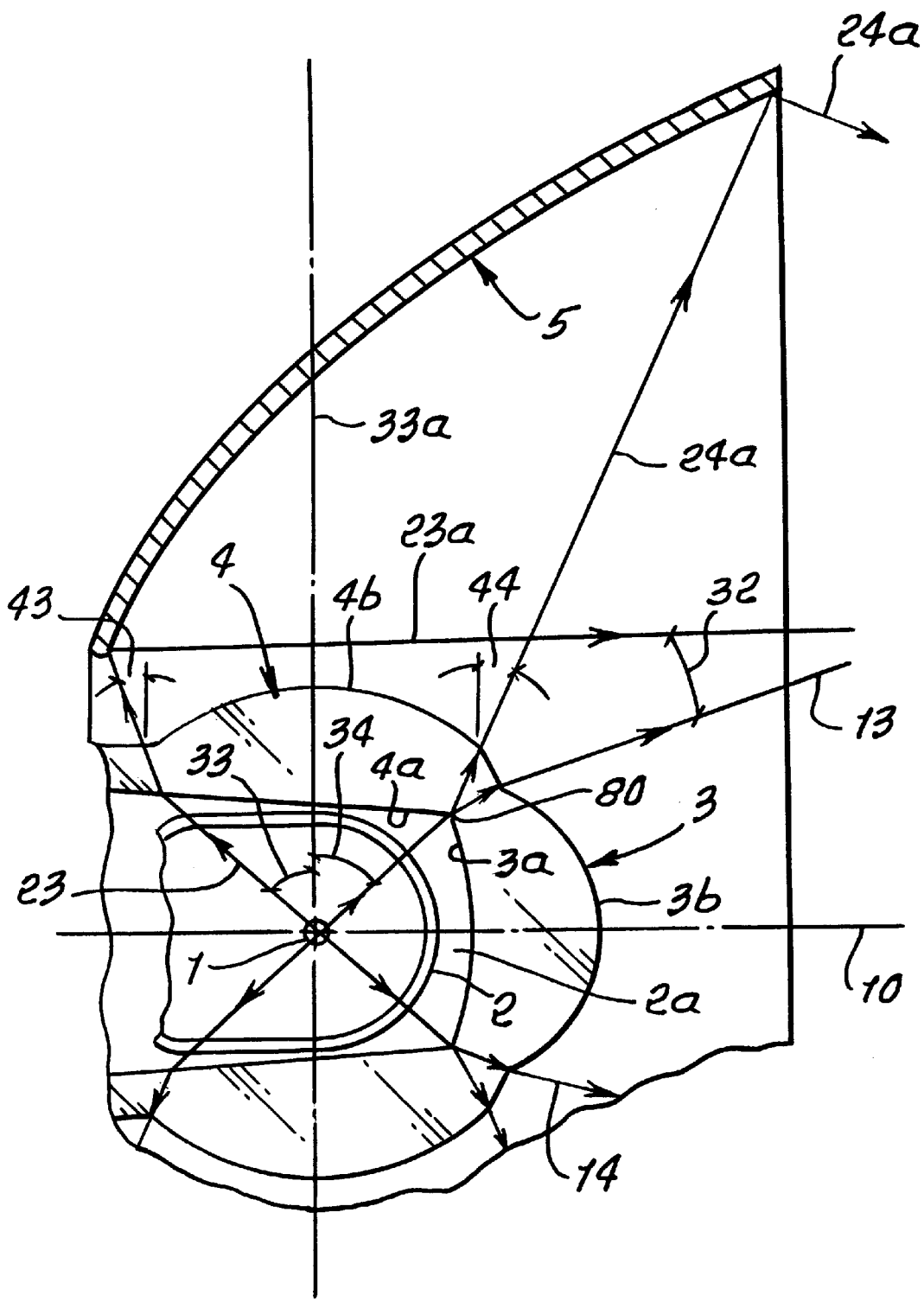

Referring to FIG. 1, light source 1 is situated inside protective transparent envelope 2 located in open space 2a formed by lens structure. The entire device is circularly symmetric about a longitudinal optical axis 10. Disposed above or forward of envelope 2 is an aspheric lens 3, with inner surface 3a and outer surface 3b. Surfaces 3a and 3b are forwardly convex, the curvature of 3b exceeding that of 3a. A central diverging beam is produced between edge rays 13 and 14 of the beam formed by the aspheric lens.

To the lateral side of envelope 2 is drum lens 4, with interior forwardly tapered surface 4a and outwardly convex exterior surface 4b. Lens 4 is annular about axis 10. It compresses the angular range of sidewards light from source 1, in that rearwardmost and lateral ray 23 having latitude angle 33 from plane 33a is redirected into latitude angle 43 for forward reflection at 23a, by reflector 5. Similarly, forwardmost and lateral ray 24 having latitude angle 34 from plane 33a is redirected to latitude angle 44, for forward reflection at 24a by the reflector. This reduces the required lateral and longitudinally size of curved reflector 5, which redirects in an upwards or forward direction the sidegoing light output of the drum lens 4. Note further that there is an annular juncture 80 between lenses 3 and 4, located to divergently refract light from the source. See rays 13 and 24a.

Figure 2:
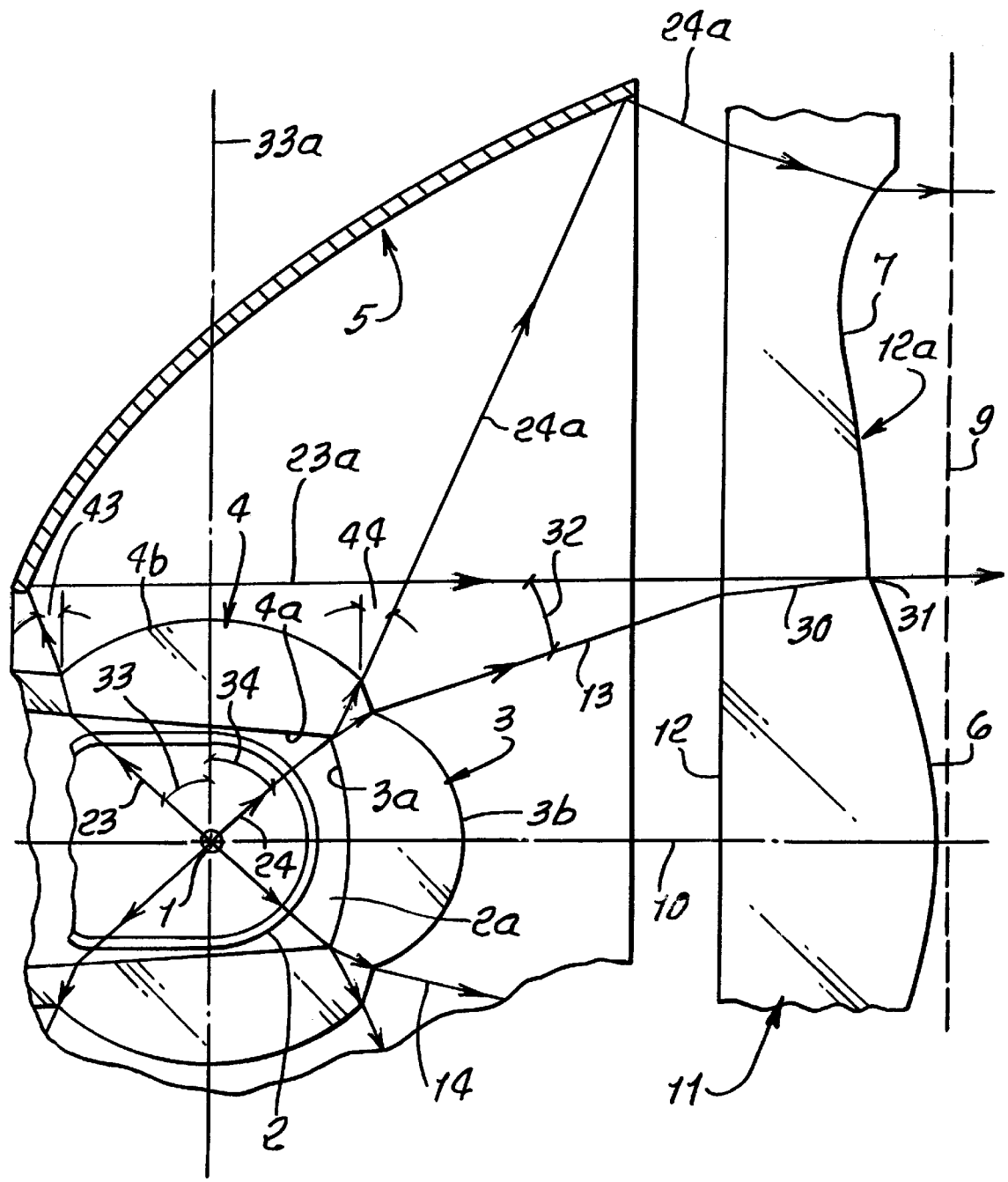

Situated above or forward of the aperture of reflector 5 is correcting lens 11, with inner, typically planar but alternatively spherical, surface 12 and outer surface 12a having inner zone 6 and annular outer zone 7. See FIG. 2. Inner forwardly convex zone 6 collimates the diverging output of aspheric lens 3. Outer forwardly concave zone 7 collimates the converging output of reflector 5. The reflector and the two lenses act harmoniously at the output side of the correcting lens 11 to illuminate target screen 9 with uniform collimated light. Thus, the beam rays 13 and 23a, substantially merge at or proximate the output at 31 of lens 11. A beam gap exists at 32. The collimation is maximal because the beam's solid angle is constant throughout its cross-section. Screen 9 may consist of a liquid crystal display.

The lenses and envelope may consist of transparent plastic or glass.

What is claimed is:

1. In a device for directing light longitudinally forwardly, the combination comprising:

a) a light source, and a protective, transparent envelope extending about the light source, b) a drum lens having a body extending about the light source and envelope, for refracting light from the source, c) a light reflector extending about the drum lens body, for forwardly and convergently re-directing refracted light received from the drum lens body, d) and a correcting lens for receiving a collimating re-directed light screened from the reflector.

2. The combination of claim 1 wherein said device has a longitudinally forwardly extending optical axis intersecting said source, said drum lens, reflector, and correcting lens being circularly symmetric about said optical axis.

3. The combination of claim 1 including an aspheric lens extending longitudinally forwardly of the envelope to receive light from the source via the envelope and to refract said light toward the correcting lens, said light refracted by the aspheric lens producing a primary beam and said light reflected by the reflector producing a secondary beam, said beams substantially merging at the correcting lens.

4. The combination of claim 3 wherein the aspheric lens is integral with the drum lens.

5. The combination of claim 3 wherein the aspheric lens has an inner surface longitudinally facing the envelope, said inner surface having forward convexity, and said aspheric lens has an outer surface longitudinally facing away from the envelope, said outer surface having forward convexity which exceeds the forward convexity of said inner surface.

6. The combination of claim 3 wherein there is a local annular juncture between the drum lens and the aspheric lens, and located to divergently refract light from the source.

7. The combination of claim 3 wherein the device has a longitudinally extending optical axis and said correcting lens has a surface facing away from the source, said surface having a first zone intersected by said axis and a second zone spaced from and extending about said axis, said first zone collimating light received via said aspheric lens and said second zone collimating light received via said reflector.

8. The combination of claim 7 wherein said surface first zone is convex in a longitudinally forward facing direction, and said second zone has a region that is concave in a longitudinally forward facing direction.

9. The combination of claim 7 including a target screen spaced forwardly of said correcting lens, said screen positioned to receive uniformly collimated light via said surface first and second zones of said correcting lens.

10. The combination of claim 9 wherein said screen comprises a liquid crystal display.

11. The combination of claim 1 including a target screen spaced forwardly of said correcting lens, said screen positioned to receive collimated light via said correcting lens.

12. The combination of claim 11 wherein said screen comprises a liquid crystal display.

13. The combination of claim 1 wherein the source is a plasma lamp.

* * * * *

UNITED STATES PATENT AND TRADEMARK OFFICE
CERTIFICATE OF CORRECTION

PATENT NO. : 6,166,860
DATED : December 26, 2000
INVENTOR(S) : Vladimir Medvedev & William A. Parkyn, Jr.

It is certified that error appears in the above-identified patent and that said Letters Patent is hereby corrected as shown below:

Title page,
Item [75], Inventors should read:
-- Vladimir Medvedev, El Segundo;
William A. Parkyn, Jr., Hawthorne, --

Signed and Sealed this

Sixth Day of November, 2001

*Attest:*

*Attesting Officer*

NICHOLAS P. GODICI
*Acting Director of the United States Patent and Trademark Office*